Sept. 20, 1932.  R. O. WALKER  1,878,075
MOTION PICTURE SCREEN
Original Filed April 27, 1929
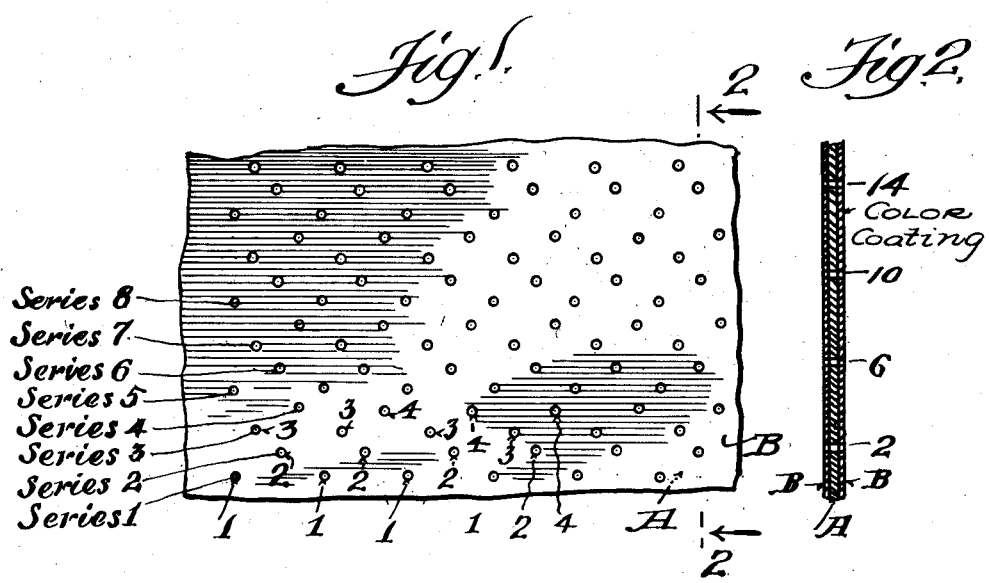
Robert O. Walker  Inventor
By his Attorneys
Darby & Darby Patented Sept. 20, 1932

1,878,075

UNITED STATES PATENT OFFICE

ROBERT O. WALKER, OF BROOKLYN, NEW YORK

MOTION PICTURE SCREEN

Application filed April 27, 1929, Serial No. 358,512. Renewed May 28, 1932.

This invention relates to the provision of a new type of talking motion picture screen adapted to reflect light and through which sound may permeate.

The object of this invention is the provision of a novel type of motion picture screen behind which a source of sound may be located, through which the sound emitted may pass, and from the outer surface of which light will be reflected.

Another object of this invention is the provision of a motion picture screen provided with a plurality of orifices therein through which sound may pass from the rear of the screen to the front thereof, and to the ears of an audience seated in front of such a screen, while the plurality of orifices are so located in said screen that although any individual orifice may be observed or seen, the plurality form themselves into no definite geometric figure such as a series of parallel lines, dark and light bands, as is the case in the various examples of the prior art.

Another object of this invention is to provide a screen having orifices therethrough through which sound may pass, said orifices being prelocated at points on said screen, and so disposed thereon that they seem to arrange themselves in no particular geometric fashion.

A still further object of this invention is the provision of a screen having orifices therethrough, which orifices, although individually apparent to a close observer, collectively seem to form themselves into no given series of straight lines, or other geometric figure.

A still further object of this invention is the provision of a screen adaptable to use with a talking motion picture, having on one side thereof a coating of material adapted to reflect light and having pierced therethrough holes through which sound may pass, which holes do not, to a close observer, seem to arrange themselves into any vertical or horizontal straight lines, bars, or shadows.

Various other objects and advantages of the invention than those hereinabove mentioned will be specifically pointed out, or will be apparent hereinafter in the course of the below detailed description of the form of the invention shown, in the accompanying drawing, as preferred ones of the various possible embodiments of the invention; it being understood, naturally, that such forms are merely illustrative of some of the many possible combinations and arrangement of parts well calculated to attain the objects of the invention, and hence detail description of such form is not to be taken as at all defining or limiting the invention itself. That is to say, the scope of protection contemplated of course to be taken from the appended claims interpreted as broadly as is consistent with the prior art.

This invention resides substantially in the construction, combination, arrangement and relative location of parts, all as will be more fully indicated hereinafter.

In the accompanying drawing;

Fig. 1 is an elevational view of a piece of my novel screen;

Fig. 2 is a view taken on the section line 2—2 looking in the direction of the arrows.

Similar reference characters refer to similar parts through the several views of the drawing.

In the past, due to the advent of the talking motion picture, various types of talking motion picture screens which are permeable to sound and reflective of light, have been made, but on which screens the observer can perceive annoying or disturbing lines or geometric figures caused by the arrangement of holes through which it is necessary that the sound pass. For this reason it has been necessary to make the holes so small as to greatly impair the sound transmission efficiency of the screen. Little advantage is gained in increasing the number of these small holes because of the small hole as used does not permit the free transmission of sound waves. It is apparent that for the best effects to be produced that the loud speaker which reproduces the recorded sound in synchronism with the particular scene that is being exhibited, that said loud speaker be located at a point very close to what appears to the eye of the observer to be the source of the sound. In other words that the loud speaker be located as close to the screen as possible. In attaining this result it is apparent that to locate the loud speaker to the side or in front of the talking motion picture screen presents insurmountable difficulties. The only logical and practicable place to locate such speaker has been found to be in the rear of the screen, and possibly almost in the center thereof. It is apparent that if the speaker be thus located in the back of a screen that the screen constitutes a direct barrier between the sound waves emitted and the ear of the observer. To overcome and surmount this difficulty the practice has been to pierce the screen with a series of holes through which the sound could directly pass from the speaker to the ear of the observer. However, it has been found that in piercing these holes, the pattern used therefor in and of itself constitutes a disturbing feature, for if the holes are in any way arranged in a straight line, as the prior art shows them to be, the eye of the observer detects what appears to be a straight line of holes across the screen. This is of course as disconcerting as the annoying effect that results from placing the loud speaker at some other point than at what appears to be the source of the sound. It is the purpose of this invention to disclose a method whereby holes may be punched in a screen, so that a very close observer, although he notes the holes, may not observe any distinct series of lines, bars, shadows or geometric pattern caused by a plurality thereof.

Referring specifically to the figures, it will be noted that in Fig. 1 a fragment of my novel screen is shown, and upon observing said figure, one will note that the little circles indicating the holes that pass therethrough are arranged in what appears to be no definite pattern, that is, although a close observer may see each individual hole, the eye does not travel along any distinct geometric pattern such as a straight line or a series of lines, bars or shadows. It is apparent that with the holes arranged as I have shown them that holes of greater size may be used without the possibility of their distracting attention from the picture being viewed. In the past the holes have been reduced in size to overcome the optical distraction caused by their seeming to arrange themselves in a straight line, and this necessarily lowered the efficiency of the screen for sound transmission. Since my series of holes arrange themselves in no definite form, I can use holes larger than usual, and thereby lower the sound impedance materially. My novel screen A is comprised of a coated fabric material or possibly rubber, or of any material that perforates satisfactorily. I coat a pyroxylin compound on both sides of the cloth base as shown in Fig. 2 by B—B. This aids in stiffening the fabric to permit of punching holes therein. The side that I choose to use as the back of my screen I coat with a colored coating so that light which passes through the holes and is reflected by any wall in back of the screen will not reduce the optical efficiency of my screen by causing a haziness thereon, rendering the screen more opaque.

Coming now to the manner in which I punch my holes after the screen has been coated with pyroxylin compound and the back thereof has been coated, it will be noticed that I have a series of holes in Fig. 1 which I have marked 1, 1, 1, 1. These holes are much larger than those used in the prior art, for the reason stated hereinbefore, and it will be seen that they actually are arranged in a straight line, although when taken in combination with the ones marked 2, 2, 2, 2, and 3, 3, 3, 3, and 4, 4, 4, 4, and the rest of the holes in the screen they do not seem to arrange themselves in a straight line. Thus I take four series of holes and space my first series in one line and leave a given distance between each hole of the series. I then stagger my second series of holes so that each hole of the second series falls on a line that may be said to bisect the line connecting any two holes of my first series, so that every hole in my second series falls halfway between the holes of my first series. My third series of holes are again staggered so that they fall halfway between my first and second series or one-quarter the way (that is the first quarter) between any two holes of my first series. In my fourth series of holes I again stagger said holes, so that they fall half-way between the holes of my second series and of my first series or one quarter the distance between any two holes of my first series (that is the third quarter). Although I have shown by the way of illustration in the disclosure sets of holes comprising four series, it is apparent that I may use any desired number of series in each recurring set. This fact may be designated generally by the symbol N, by which I mean that each group comprises N series or, in other words, any number of series.

In any given series the distance between the holes of that series is the same as the distance between the holes of any other series.

When I come to my fifth series of holes, indicated generally by 5, reading across the figure from left to right, I again locate these holes directly over and in line with my series 1, 1, 1, 1, and I locate my series 6 over my series of holes 2, 2, 2, 2, series 7 over series 3, 3, 3, 3, and series 8 over series 4, 4, 4, 4. I have thus shown what may be termed a complete cycle of my series of holes, which cycle obviously is repeated throughout the body of the screen. The fact that the holes of any given series are arranged in a straight line may be observed by placing the eye upon any given hole of any given series, and looking for the next hole of that series, and it will then be seen that all the remaining holes of that series are in a straight line, but to look at the screen as shown in the accompanying figures, not endwise, but directly, it does not appear that the holes are arranged in any definite relation.

Now referring back to Fig. 2, it will be seen that the screen shows the holes passing through the screen of the 2, 6, 10 and 14 series. That is a given section passing through any hole will include thereafter holes of every fourth series thereafter.

As before mentioned the hole in use at present is necessarily much smaller than I use, the reason for such small size being that in order to prevent the observer noticing said holes as being in a straight line, it becomes necessary to decrease the size thereof. The average run of hole at the present time is the hole of .041—.050" diameter, and this size hole constricts the passage of sound waves. This is the largest size to which the hole has in practice been increased for to increase it further makes it noticeable, when arranged in definite series of lines. It is possible, with my novel scheme, of distributing my holes over my talking motion picture screen to use a hole of .0625" diameter and larger, and still not have the optical effect thereof annoying. If is further apparent that due to the use of these large sized holes that the sound impedance of my screen as a whole is of negligible magnitude and that whether the screen be lowered or raised in front of the loud speaker is immaterial, no difference in the intensity of the sound being noticed either upon a raising or lowering of said screen.

Inasmuch as many changes may be made in the above construction and many apparently widely different embodiments of invention can be made without departing from the scope thereof it is intended that all matter contained in the above description or shown in the accompanying drawing shall be interpreted as illustrative, and not in any limiting sense.

It is also to be understood that the language contained in the following claims is intended to cover all the generic and specific features of the invention herein described, and all statements of the scope of the invention which as a matter of language might be said to fall therebetween.

Although I have described a given method of punching holes in a talking motion picture screen, so that the holes do not appear to arrange themselves in any distinct geometric figure to the eye of a close observer, it is apparent to those skilled in the art that it is possible that many other means, methods or designs might be obtained or worked out with this as a basis whereby the same effect may be attained. I do not intend to limit myself to the exact method of punching or location of punching shown further than I do by the hereafter appended claims.

What I seek to secure by United States Letters Patent is:

1. As a new article of manufacture a talking motion picture screen having a plurality of holes disposed therein, in sets of four series, each of said series being staggered in quarter relation to at least one of the other series.

2. The structure recited in claim 1, characterized in this, namely that a second series of said plurality of holes is disposed so that each hole in said series falls halfway between the holes in said first series, while the holes in the third series are disposed so that they fall quarter the way between the holes of said first and second series and constitute a quarter series of holes while the holes of the fourth series also fall a quarter of the way between the holes of said first and second series, but constitute a third quarter series of holes, the fifth series of said holes falling back again in line with the first series.

3. The structure recited in claim 1, characterized in this, namely that said four series of holes is repeated throughout the body of the talking motion picture screen.

4. As a new article of manufacture, a talking motion picture screen having holes, relatively larger than could be used if arranged in a simple geometric pattern, predeterminately spaced and staggered therein, and so arranged that they form themselves, to the eye of a close observer, into no direct geometric figure, although the holes be individually apparent, while such larger sized holes permits of the screen having a very low sound impedance.

In testimony whereof I have hereunto set my hand on this 20th day of April, A. D., 1929.

ROBERT O. WALKER.